(12) United States Patent
Salmeri et al.

(10) Patent No.: US 11,548,350 B2
(45) Date of Patent: Jan. 10, 2023

(54) SOLAR POWERED TEMPERATURE MODULATION ASSEMBLY FOR MOTOR VEHICLE PASSENGER COMPARTMENT

(71) Applicants: Salvatore Paul Salmeri, Springfield, OR (US); Kevin Michael Kilpatrick, Dexter, OR (US)

(72) Inventors: Salvatore Paul Salmeri, Springfield, OR (US); Kevin Michael Kilpatrick, Dexter, OR (US)

( * ) Notice: Subject to any disclaimer, the term of this patent is extended or adjusted under 35 U.S.C. 154(b) by 913 days.

(21) Appl. No.: 16/289,914

(22) Filed: Mar. 1, 2019

(65) Prior Publication Data
US 2019/0275859 A1     Sep. 12, 2019

Related U.S. Application Data

(60) Provisional application No. 62/917,683, filed on Dec. 26, 2018, provisional application No. 62/709,255, filed on Jan. 2, 2018.

(51) Int. Cl.
*F25B 21/02* (2006.01)
*B60H 1/00* (2006.01)

(52) U.S. Cl.
CPC ..... *B60H 1/00428* (2013.01); *B60H 1/00264* (2013.01); *B60H 1/00478* (2013.01); *F25B 21/02* (2013.01); *F25B 2321/021* (2013.01); *F25B 2700/2104* (2013.01)

(58) Field of Classification Search
CPC .. B60H 1/00478; B60H 1/00428; F25B 21/02
See application file for complete search history.

(56) References Cited

U.S. PATENT DOCUMENTS

| | | | |
|---|---|---|---|
| 3,943,726 A * | 3/1976 | Miller | B60H 1/00428 454/156 |
| 5,588,909 A | 12/1996 | Ferng | |
| 5,826,435 A | 10/1998 | Hange | |
| 2007/0234742 A1* | 10/2007 | Aoki | B60H 1/00285 62/3.3 |
| 2009/0000311 A1* | 1/2009 | Kmetz | B60H 1/00478 62/3.61 |
| 2009/0247063 A1 | 10/2009 | Vollertsen | |

* cited by examiner

*Primary Examiner* — Brian M King
(74) *Attorney, Agent, or Firm* — The Keys Law Firm PLLC

(57) ABSTRACT

A temperature modulation assembly for a motor vehicle's passenger compartment includes an assembly panel having a single or a plurality of solar panels which convert sunlight into electricity and an assembly housing which includes an internal thermoelectric Peltier cooler having a heat sink on its cool side and a heat sink on its hot side and an internal fluid distribution module which draws air into the assembly housing, causes some of the air to be cooled by passing through the cool side heat sink and directed back into the passenger compartment and the rest of the air to be heated by passing through the hot side heat sink and directed back into the passenger compartment. The components of the assembly housing utilize electricity that originates at the assembly panel, and the assembly housing is structured to distribute cooled towards near the passenger seating and heated air towards the windshield.

15 Claims, 3 Drawing Sheets

SOLAR POWERED TEMPERATURE MODULATION ASSEMBLY FOR MOTOR VEHICLE PASSENGER COMPARTMENT

CROSS REFERENCE TO RELATED APPLICATIONS

This application claims the benefit of and incorporates by reference U.S. provisional patent application Ser. No. 62/709,255, filed Jan. 2, 2018, for which a petition to restore the benefit thereof has been concurrently filed, and co-pending U.S. provisional patent application Ser. No. 62/917,683 filed Dec. 26, 2018.

BACKGROUND OF THE INVENTION

Field of the Invention

This invention relates to a solar powered cooling and heating device for the passenger compartment of a motor vehicle.

Description of the Prior Art

In modern times, it is common for many type of motor vehicles to include an enclosed passenger compartment that operates to provide, among other things, seating of the driver and passengers of the vehicle. For motor vehicles with such an enclosed passenger compartment, mechanisms for providing heating and cooling functionality are generally provided so that the internal environment of the compartment can be regulated as desired by the occupants. Because they generally require a substantial amount of power or energy to operate, however, such mechanisms for providing heating and cooling functionality typically only operate while a vehicle is in use. As a result, during the times when the vehicle is not in use, the passenger compartment can become very hot or cold depending on weather conditions. Therefore, a problem which still exists is that the passenger compartments of vehicles commonly become very hot or cold in between uses of the vehicle.

Accordingly, what is needed is a temperature modulation assembly for a motor vehicle's passenger compartment which uses electricity generated from solar radiation to power a thermoelectric cooler. It would additionally be desirable for such a temperature modulation assembly to employ fans to direct ambient air across both the cool side and the hot side of the thermoelectric cooler in a manner which causes the cooled air and heated air to automatically be strategically distributed in the vehicle.

SUMMARY OF THE INVENTION

The present disclosure describes a temperature modulation assembly for a motor vehicle's passenger compartment, comprising: an assembly panel configured to convert sunlight into electricity; an assembly housing integral with said assembly panel and defining an enclosure having a lower internal portion, an upper internal portion, a front region and a pair of opposing side regions; a front vent integral with said front region; at least one side screen integral with at least one of said pair of opposing side regions; a thermoelectric Peltier cooler integral with said assembly housing and having a first side and a second side and configured to transfer heat from the first side to the second side when supplied with electricity that originated at the assembly panel, wherein said thermoelectric Peltier cooler is oriented such that the first side is positioned in said lower internal portion and said second side is positioned in said upper internal portion; and a fluid distribution module integral with said assembly housing and adapted to draw a fluid material into the assembly housing, cause a first portion of said fluid material to be cooled by operation of the first side of the thermoelectric Peltier cooler and directed out of the lower internal portion and the assembly housing, and cause a second portion of said fluid material to be heated by operation of the second side of the thermoelectric Peltier cooler and directed out of the upper internal portion and the assembly housing when supplied with electricity that originated at the assembly panel.

The fluid distribution module may comprise a cool side distribution fan and a hot side distribution fan which direct fluid material in the lower internal portion and upper internal portion, respectively, out of the front vent, and a pair of intake fans which draw fluid material into the lower internal portion and upper internal portion through the at least one side screen.

It is an object of this invention to provide a temperature modulation assembly for a motor vehicle's passenger compartment which uses electricity generated from solar radiation to power a thermoelectric cooler.

It is another object of this invention to provide a temperature modulation assembly for a motor vehicle's passenger compartment which employs fans to direct ambient air across both the cool side and the hot side of the thermoelectric cooler in a manner which causes the cooled air and heated air to automatically be strategically distributed in the vehicle.

These and other objects will be apparent to one of skill in the art.

DETAILED DESCRIPTION OF THE INVENTION

Figure 1:
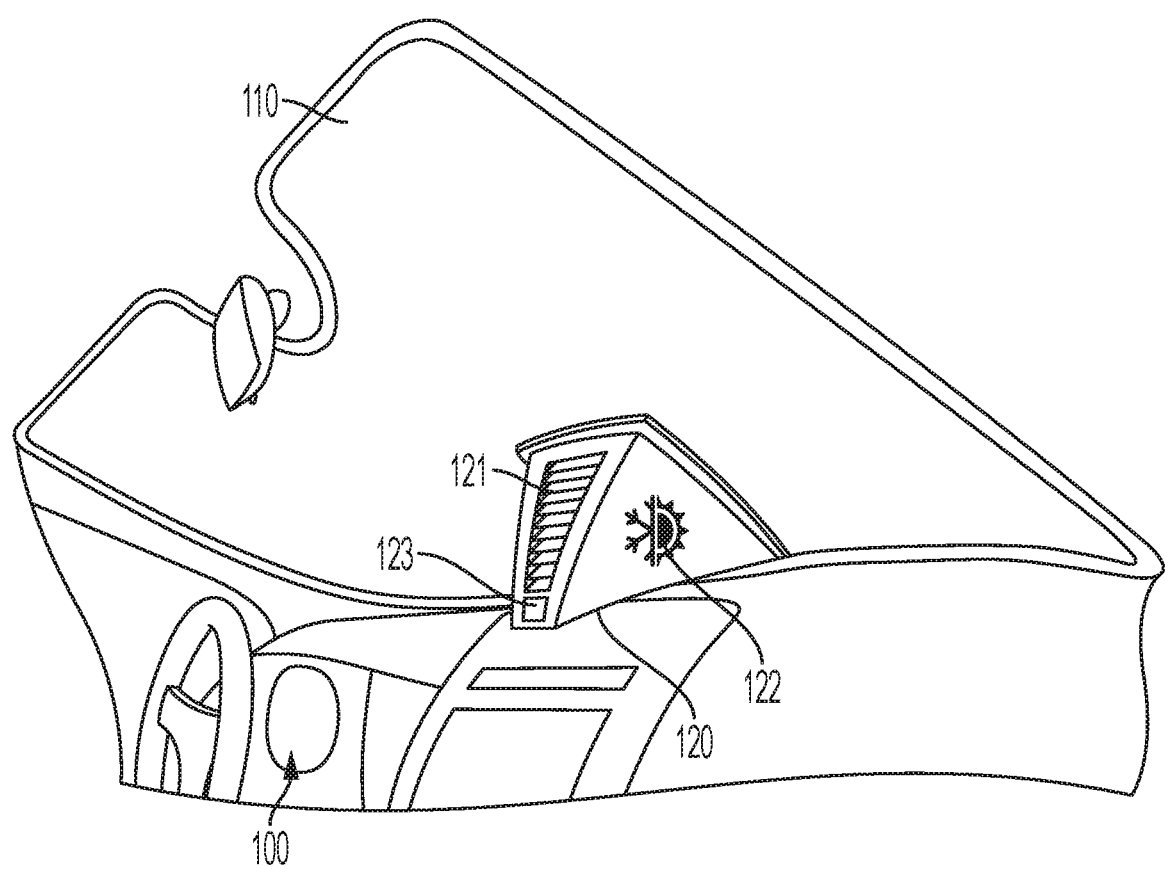
FIG. 1 is a side perspective view of a temperature modulation assembly for a motor vehicle's passenger compartment built in accordance with the present invention.
Figure 2:
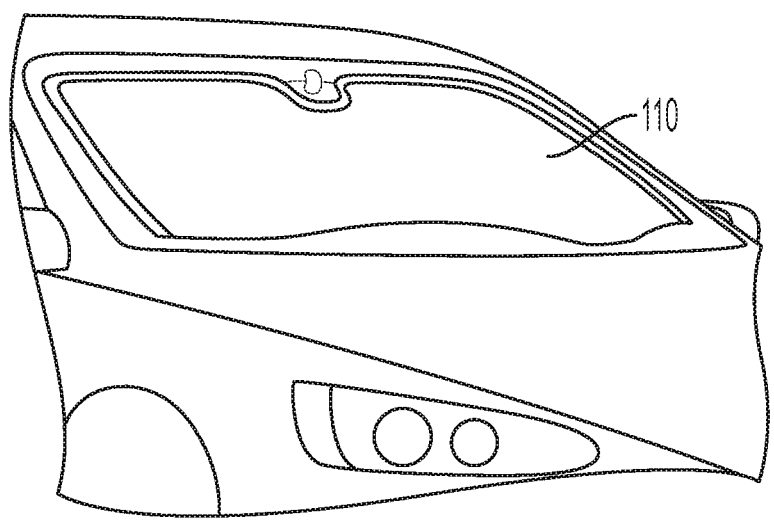
FIG. 2 is a back perspective view of a temperature modulation assembly for a motor vehicle's passenger compartment built in accordance with the present invention shown positioned against a front windshield of a vehicle.
Figure 3:
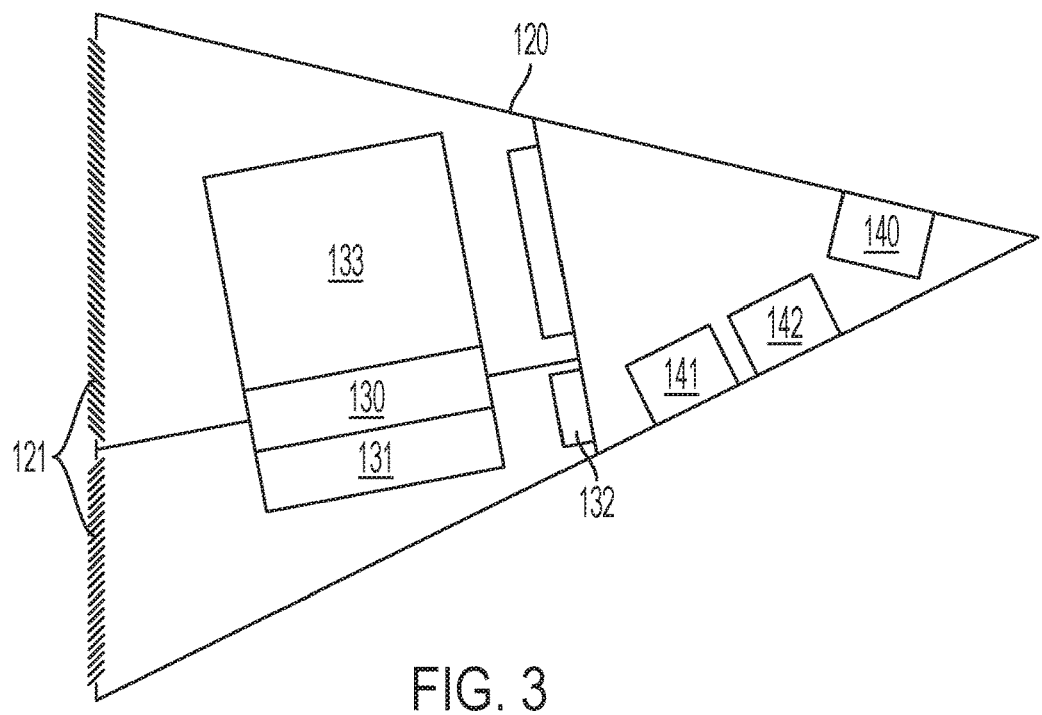
FIG. 3 is a side elevational view showing a cross section of assembly housing of a temperature modulation assembly for a motor vehicle's passenger compartment built in accordance with the present invention.
Figure 4:
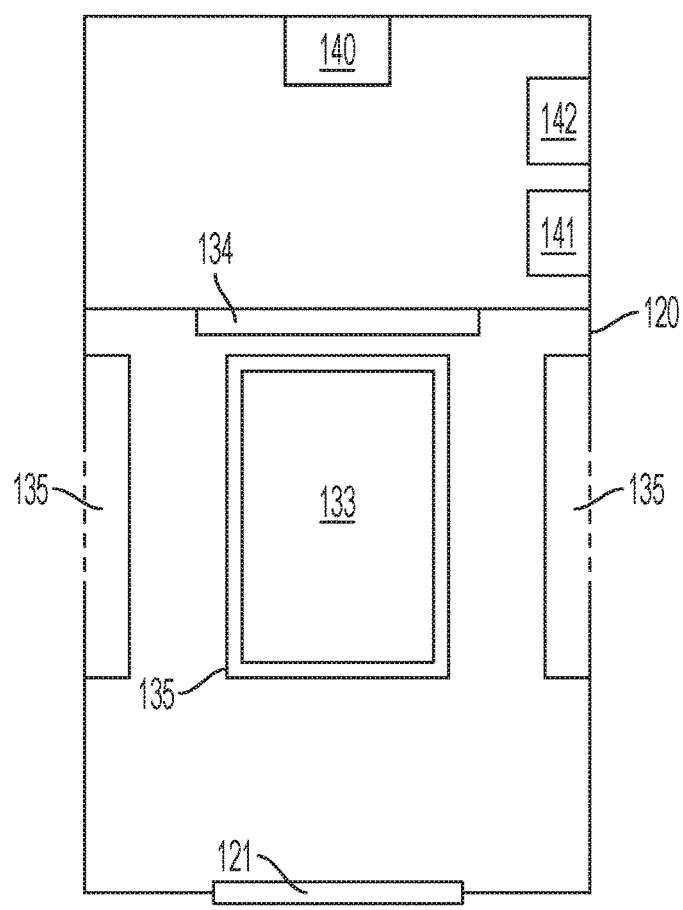
FIG. 4 is a top plan view showing a cross section of the assembly housing of a temperature modulation assembly for a motor vehicle's passenger compartment built in accordance with the present invention.
Figure 5:
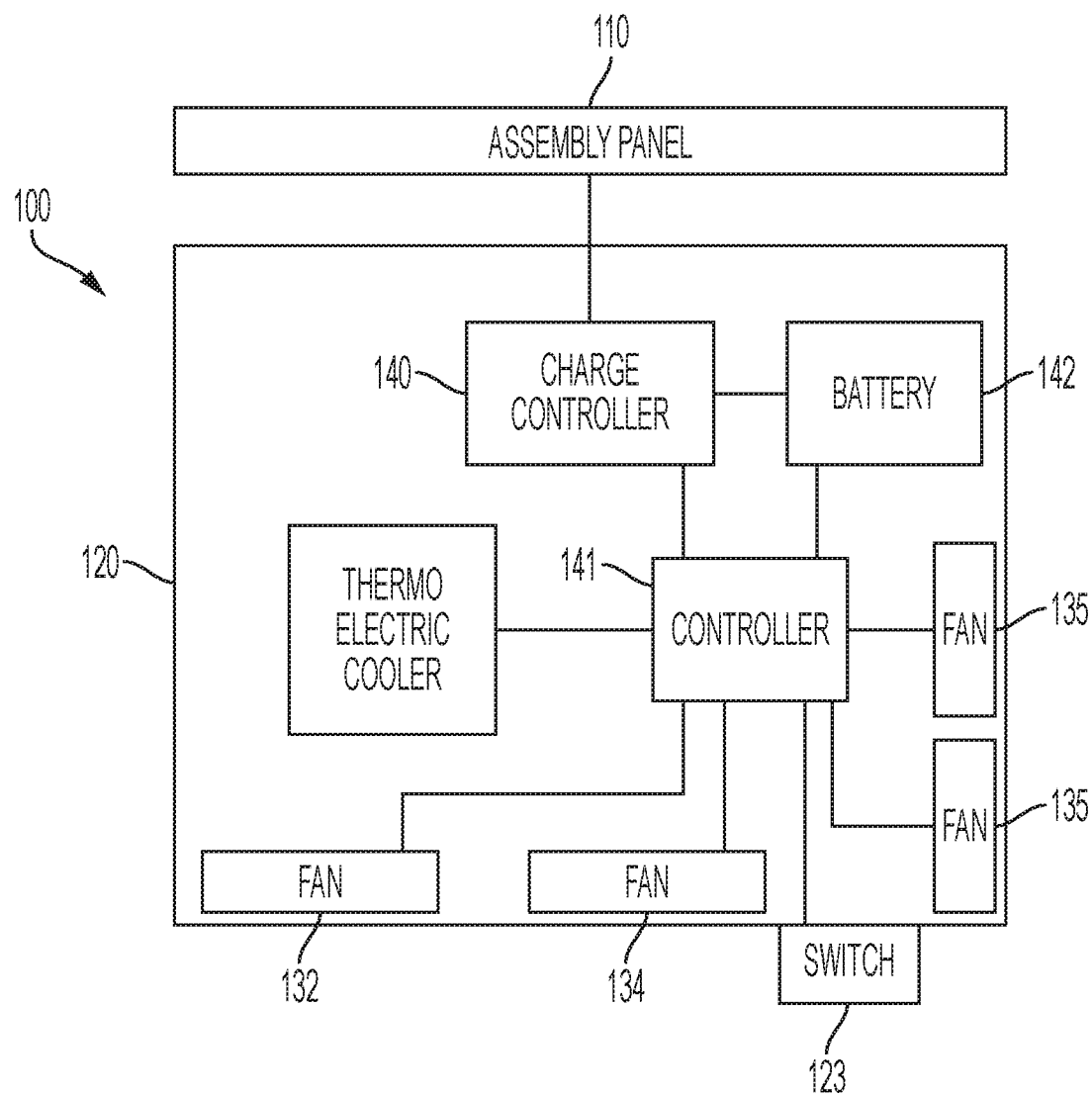
FIG. 5 is a schematic diagram showing the operational components of a temperature modulation assembly for a motor vehicle's passenger compartment built in accordance with the present invention.

Referring now to the drawings and in particular FIGS. 1 and 2, a temperature modulation assembly 100 for a motor vehicle's passenger compartment is shown having an assembly panel 110 and an assembly housing 120. The assembly panel 110 may include a single or a plurality of solar panels which are operative to absorb photons in sunlight and create a photovoltaic effect that converts the sunlight into electricity. The components housed in the assembly housing 120 then utilize electricity to direct some air from in the vehicle over a cooling surface and then back into the vehicle and some air from in the vehicle over a warming surface and then back into the vehicle, as described below with reference to FIGS. 3-5.

Referring now to FIGS. 1, 2, 3, 4, and 5, the assembly housing 120 includes a plurality of temperature control components and a plurality of electrical control components. The temperature control components include a thermoelectric Peltier cooler 130, a cool side heat sink 131, a cool side distribution fan 132, a hot side heat sink 133, a hot side distribution fan 134, and a pair of intake fans 135. The electrical control components include a charge controller 140, a controller 141, and a battery 142. The exterior of the assembly housing 120 includes a front vent 121, a pair of side screens 122 each positioned on opposing sides of the assembly housing and disposed in a side wall of the assembly housing 120, and a manually actuated switch 123. While most of the side walls of the assembly housing 120 may be constructed of solid material, it is contemplated that the front vent 121 may include a plurality of fins to allow air to flow in and out of the front of the assembly housing 120 through the front vent 121 and side screens 122 may be formed of a mesh material to allow air to flow in and out of the sides of the assembly housing 120 through the side screens 122.

The interior of the assembly housing 120 may be divided by a divider wall 124 so as to form an upper compartment and a lower compartment. The fins of the front vent 121 which are in front of the upper compartment may be angled upward (i.e., directing away from the lower compartment) and the fins of the front vent which are in front of the lower compartment may be angled downward (i.e., directing away from the upper compartment). The divider wall 124 is positioned such that air flowing into the side screens 122 may enter the upper compartment or the lower compartment. Positioned next to each of the side screens 122 is one of the intake fans 135. When in provided with electricity, each intake fan 135 is operative to pull air from outside of the assembly housing 120 into the assembly housing 120 through the side screen 122 that it is positioned next to.

Integral with the divider wall 124 is the thermoelectric Peltier cooler 130, with the cool side thereof oriented to face the lower compartment of the assembly housing 120 and the opposing hot side thereof oriented to face the upper compartment of the assembly housing 120. It is appreciated that when the thermoelectric Peltier cooler 130 is supplied with direct current electricity, it brings heat from one side to the other. Accordingly, the "cool side" of the thermoelectric Peltier cooler 130, as referenced herein, refers to the side of the thermoelectric Peltier cooler 130 from which heat is brought and the "hot side" of the thermoelectric Peltier cooler 130, as referenced herein, refers to the side of the thermoelectric Peltier cooler 130 to which heat is brought.

The cool side heat sink 131 is attached to the cool side of the thermoelectric Peltier cooler 130 and extends downward into the lower compartment of the assembly housing 120. The cool side distribution fan 132 is positioned behind the cool side heat sink 131, so that when activated, it directs air across the cool side heat sink 131 and out of the lower part of the front vent 121. It is contemplated that when the cool side distribution fan 132 is activated, it is primarily the air flowing into the side screens 122 that enters the lower compartment that is being directed across the cool side heat sink 131 and out of the lower part of the front vent 121 by the cool side distribution fan 132.

The hot side heat sink 133 is attached to the hot side of the thermoelectric Peltier cooler 130 and extends upward into the upper compartment of the assembly housing 120. The hot side distribution fan 134 is positioned behind the hot side heat sink 133, so that when activated, it directs air across the hot side heat sink 133 and out of the upper part of the front vent 121. It is contemplated that when the hot side distribution fan 134 is activated, it is primarily the air flowing into the side screens 122 that enters the upper compartment that is being directed across the hot side heat sink 133 and out of the upper part of the front vent 121 by the hot side distribution fan 134.

The assembly panel 110 may be electrically connected to the assembly housing 120, and more particularly, to the charge controller 140 in the assembly housing 120. The charge controller 140 is electrically interconnected with the controller 141 and the battery 142 so that the charge controller 140 can manage the supply of electricity from the assembly panel 110 to the controller 141 and to the battery 142 and the storage of such electricity in the battery 142. In addition, the controller 141 is electrically connected to the thermoelectric Peltier cooler 130, cool side distribution fan 132, hot side distribution fan 134, intake fans 135, and switch 123 and includes software containing instructions which enables it to selectively supply electricity from either the charge controller 140 or battery 142 either automatically or in response to actuation of the switch 123. It is appreciated that the electrical connections between components may be through electrical wiring (not shown).

In operation, when the thermoelectric Peltier cooler 130, cool side distribution fan 132, hot side distribution fan 134, intake fans 135 are supplied electricity, the Peltier cooler 120 operates to absorb heat in the air that is being directed into the lower compartment of the assembly housing 120 by operation of the intake fans 135 and across the cool side heat sink 131 by operation of the cool side distribution fan 132. As a result, air that exits the lower part of the front vent 121 by operation of the cool side distribution fan 132 is cooled relative to most of the air in the passenger compartment. At the same time, air being directed into the upper compartment by operation of the intake fans 135 is directed across the hot side heat sink 133 by operation of the hot side distribution fan 134 where it absorbs heat therein (which was transferred from the cool side of the thermoelectric Peltier cooler 130 by way of the hot side of the thermoelectric Peltier cooler 130). This air is heated through its absorption of heat from the hot side heat sink 133 prior to exiting from the upper part of the front vent 121 by operation of the hot side distribution fan 134.

Because this cooled air will be more dense than the ambient air in the vehicle, it will remain in a lower part of the passenger compartment, near the passenger seating. Conversely, because the heated air will be less dense than the ambient air in the vehicle, it will run up the windshield and stay adjacent to the ceiling of the passenger compartment of the vehicle. As such, it is contemplated that the temperature modulation assembly 100 may additionally operate to prevent the formation or accumulation of frozen material on a windshield on a sunny but cold day.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:
1. A temperature modulation assembly for a motor vehicle's passenger compartment, comprising:

an assembly panel configured to convert sunlight into electricity;

an assembly housing integral with said assembly panel and defining an enclosure having a discrete lower internal compartment, a discrete upper internal compartment, a front region and a pair of opposing side regions;

a front vent integral with said front region, wherein at least a portion of said front vent is positioned in front of lower internal compartment and includes a plurality of upper fins which are angled upward and at least a portion of said front vent is positioned in front of lower internal compartment and includes a plurality of lower fins which are angled downward;

at least one side screen integral with at least one of said pair of opposing side regions;

a thermoelectric Peltier cooler integral with said assembly housing and having a first side and a second side and configured to transfer heat from the first side to the second side when supplied with electricity that originated at the assembly panel, wherein said thermoelectric Peltier cooler is oriented such that the first side is positioned in said lower internal compartment and said second side is positioned in said upper internal compartment; and a fluid distribution module integral with said assembly housing and adapted to (1) draw a fluid material into the assembly housing, (2) cause a first portion of said fluid material to enter the lower internal compartment to be cooled by operation of the first side of the thermoelectric Peltier cooler and directed out of the lower internal compartment and the assembly housing while passing through the lower fins, and (3) cause a second portion of said fluid material to enter the upper internal compartment to be heated by operation of the second side of the thermoelectric Peltier cooler and directed out of the upper internal compartment and the assembly housing while passing through the upper fins, all when said fluid distribution module is supplied with electricity that originated at the assembly panel.

2. The temperature modulation assembly for a motor vehicle's passenger compartment of claim 1, additionally comprising a cool side heat sink attached to the first side of the thermoelectric Peltier cooler.

3. The temperature modulation assembly for a motor vehicle's passenger compartment of claim 2, wherein said fluid distribution module includes a cool side distribution fan which causes the first portion of said fluid material to be cooled and directed out of the lower internal compartment and the assembly housing.

4. The temperature modulation assembly for a motor vehicle's passenger compartment of claim 1, wherein said fluid distribution module includes a cool side distribution fan which causes the first portion of said fluid material to be cooled and directed out of the lower internal compartment and the assembly housing.

5. The temperature modulation assembly for a motor vehicle's passenger compartment of claim 1, additionally comprising a hot side heat sink attached to the second side of the thermoelectric Peltier cooler.

6. The temperature modulation assembly for a motor vehicle's passenger compartment of claim 5, wherein said fluid distribution module includes a hot side distribution fan which causes the second portion of said fluid material to be heated and directed out of the upper internal compartment and the assembly housing.

7. The temperature modulation assembly for a motor vehicle's passenger compartment of claim 1, wherein said fluid distribution module includes a hot side distribution fan which causes the second portion of said fluid material to be heated and directed out of the upper internal compartment and the assembly housing.

8. The temperature modulation assembly for a motor vehicle's passenger compartment of claim 1, additionally comprising a battery integral with said assembly housing and operative to store electricity that originated at the assembly panel.

9. The temperature modulation assembly for a motor vehicle's passenger compartment of claim 1, additionally comprising a charge controller operative to at least manage the supply of electricity from the assembly panel to the battery and the storage of such electricity in the battery.

10. The temperature modulation assembly for a motor vehicle's passenger compartment of claim 1, wherein said fluid distribution module includes at least one intake fan operative to draw the fluid material into the lower internal compartment and the upper internal compartment of the assembly housing.

11. A temperature modulation assembly for a motor vehicle's passenger compartment, comprising:
an assembly panel configured to convert sunlight into electricity;

an assembly housing integral with said assembly panel and defining an enclosure having a discrete lower internal compartment, a discrete upper internal compartment, a front region and a pair of opposing side regions;

a front vent integral with said front region, wherein at least a portion of said front vent is positioned in front of lower internal compartment and includes a plurality of upper fins which are angled upward and at least a portion of said front vent is positioned in front of lower internal compartment and includes a plurality of lower fins which are angled downward;

at least one side screen integral with at least one of said pair of opposing side regions;

a thermoelectric Peltier cooler integral with said assembly housing and having a first side and a second side and configured to transfer heat from the first side to the second side when supplied with electricity that originated at the assembly panel, wherein said thermoelectric Peltier cooler is oriented such that the first side is positioned in said lower internal compartment and said second side is positioned in said upper internal compartment;

a fluid distribution module integral with said assembly housing and adapted to (1) draw a fluid material into the assembly housing, (2) cause a first portion of said fluid material to enter the lower internal compartment to be cooled by operation of the first side of the thermoelectric Peltier cooler and directed out of the lower internal compartment and the assembly housing while passing through the lower fins, and (3) cause a second portion of said fluid material to enter the upper internal compartment to be heated by operation of the second side of the thermoelectric Peltier cooler and directed out of the upper internal compartment and the assembly housing while passing through the upper fins, all when said fluid distribution module is supplied with electricity that originated at the assembly panel;

a cool side heat sink attached to the first side of the thermoelectric Peltier cooler;

a hot side heat sink attached to the second side of the thermoelectric Peltier cooler; and a battery integral with said assembly housing and operative to store electricity that originated at the assembly panel.

12. The temperature modulation assembly for a motor vehicle's passenger compartment of claim 11, wherein said fluid distribution module includes a cool side distribution fan which causes the first portion of said fluid material to be cooled and directed out of the lower internal compartment and the assembly housing.

13. The temperature modulation assembly for a motor vehicle's passenger compartment of claim 12, wherein said fluid distribution module includes a hot side distribution fan which causes the second portion of said fluid material to be heated and directed out of the upper internal compartment and the assembly housing.

14. The temperature modulation assembly for a motor vehicle's passenger compartment of claim 13, wherein said fluid distribution module includes at least one intake fan operative to draw the fluid material into the lower internal compartment and the upper internal compartment of the assembly housing.

15. The temperature modulation assembly for a motor vehicle's passenger compartment of claim 11, additionally comprising a charge controller operative to at least manage the supply of electricity from the assembly panel to the battery and the storage of such electricity in the battery.

* * * * *